United States Patent
Tokunaga (10) Patent No.: US 7,158,565 B2
(45) Date of Patent: Jan. 2, 2007

(54) WAVEFORM EQUALIZER AND SHIFT REGISTER

(75) Inventor: Naoya Tokunaga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 769 days.

(21) Appl. No.: 10/409,090

(22) Filed: Apr. 9, 2003

(65) Prior Publication Data

US 2004/0013187 A1    Jan. 22, 2004

(30) Foreign Application Priority Data

Jul. 17, 2002    (JP)    ............................. 2002-208133

(51) Int. Cl.
*H03H 7/30*    (2006.01)
*H03K 1/159*    (2006.01)

(52) U.S. Cl. ........................................ 375/229; 375/230

(58) Field of Classification Search ................ 375/229, 375/230, 232; 333/28 R; 360/65
See application file for complete search history.

(56) References Cited

U.S. PATENT DOCUMENTS

| | | | | |
|---|---|---|---|---|
| 5,414,732 A | * | 5/1995 | Kaufmann | .................. 375/232 |
| 6,233,107 B1 | * | 5/2001 | Minuhin | ....................... 360/51 |
| 6,621,862 B1 | * | 9/2003 | Dabell | .......................... 375/229 |
| 7,035,330 B1 | * | 4/2006 | Shanbhag et al. | ........... 375/234 |
| 2002/0118741 A1 | * | 8/2002 | Tokunaga et al. | ............ 375/229 |

FOREIGN PATENT DOCUMENTS

| | | |
|---|---|---|
| JP | 06-181424 | 6/1994 |
| JP | 06-350878 | 12/1994 |

\* cited by examiner

*Primary Examiner*—Emmanuel Bayard
*Assistant Examiner*—Lawrence Williams
(74) *Attorney, Agent, or Firm*—McDermott Will & Emery LLP (57) ABSTRACT

In a tap 1 in a shift register of a waveform equalizer, data of an input signal is stored in a data storing FF 111. A tap coefficient computing unit 114 calculates a tap coefficient, which is stored in a tap coefficient storing FF 112 and output to an absolute value computing unit 115. The unit 115 obtains the absolute value of the tap coefficient. A comparator 116 compares the absolute value to a threshold value. A masking unit 117 masks and outputs the data from the data storing FF 111 to a multiplier 113 if the absolute value is smaller than the threshold value, while outputting the data from the data storing FF 111 without change if the absolute value is no less than the threshold value. The multiplier 113 multiplies the data of the input signal by the tap coefficient and outputs a signal to an adder 108.

20 Claims, 8 Drawing Sheets

WAVEFORM EQUALIZER AND SHIFT REGISTER

BACKGROUND OF THE INVENTION

The present invention relates to waveform equalizers for reducing transmission path distortion of digital signals used for digital broadcasting.

Digital broadcasting has been mainly used in satellite broadcasting, and recently, a wave of digitalization has been sweeping terrestrial broadcasting also. Waveform-equalizing technology for reducing transmission path distortion is essential for the terrestrial digital broadcasting. A waveform equalizer receives an input signal on which distortion caused by multipath interference has become superimposed under the influence of reflected waves and the like, and produces an output signal in which the distortion is reduced.

Hereinafter, a known waveform equalizer for terrestrial digital broadcasting will be described with reference to FIGS. 2 and 8. The equalizer in this example is used in a digital television (DTV) system employing 8-level vestigial side band (8-VSB) modulation, which has been adopted in the U.S.

Figure 8:
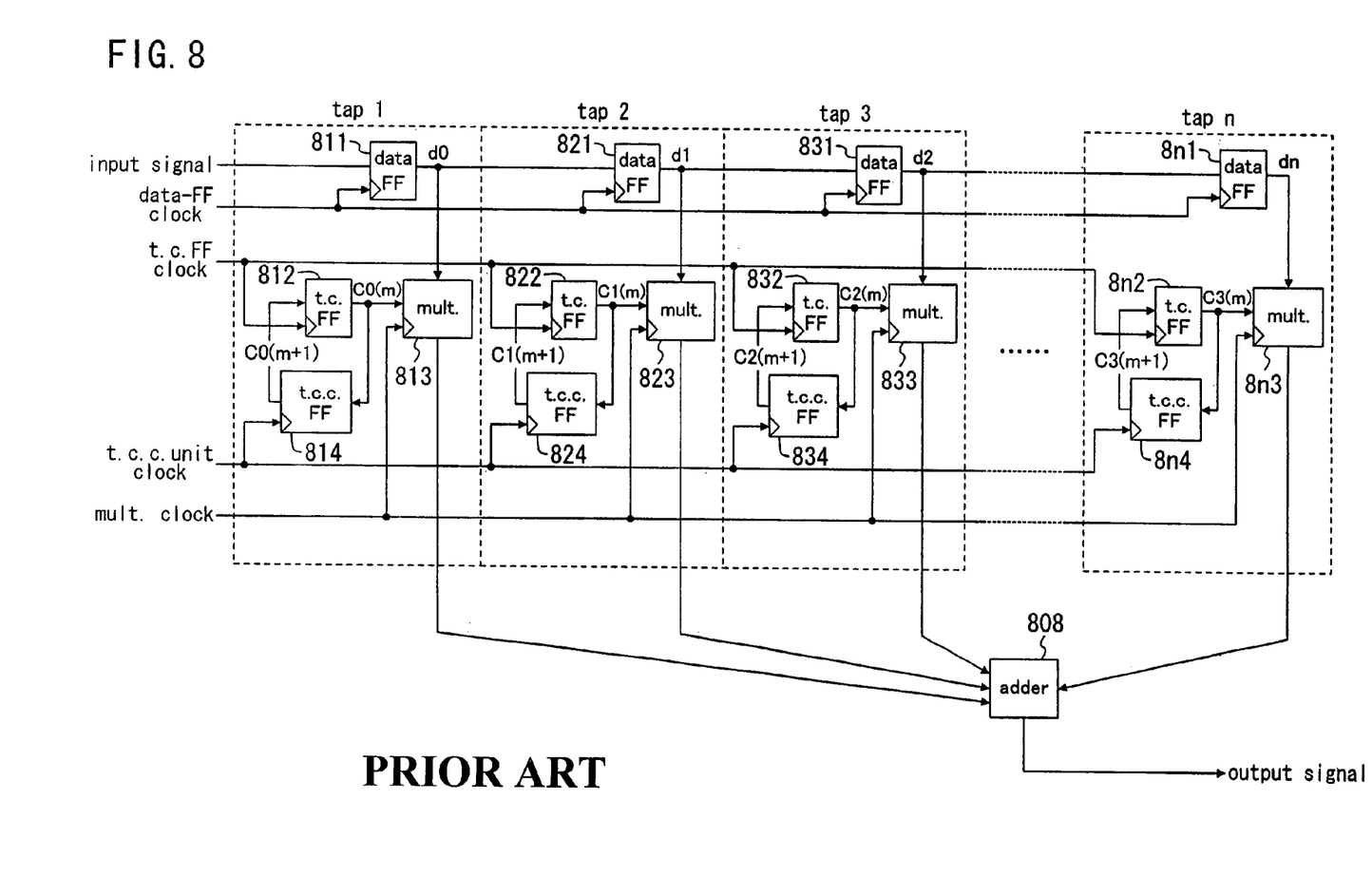
FIG. 8 is a circuit diagram showing a configuration of a known filter.

FIG. 8 is a circuit diagram showing a configuration of a filter that is part of the known waveform equalizer. FIG. 2 is a diagram schematically showing a configuration of a waveform equalizer according to the embodiments of the present invention. Apart from the configuration inside the filter, the components of the inventive waveform equalizer are the same as those of the known equalizer. Therefore, FIG. 2 is also used for describing the known waveform equalizer.

Figure 2:
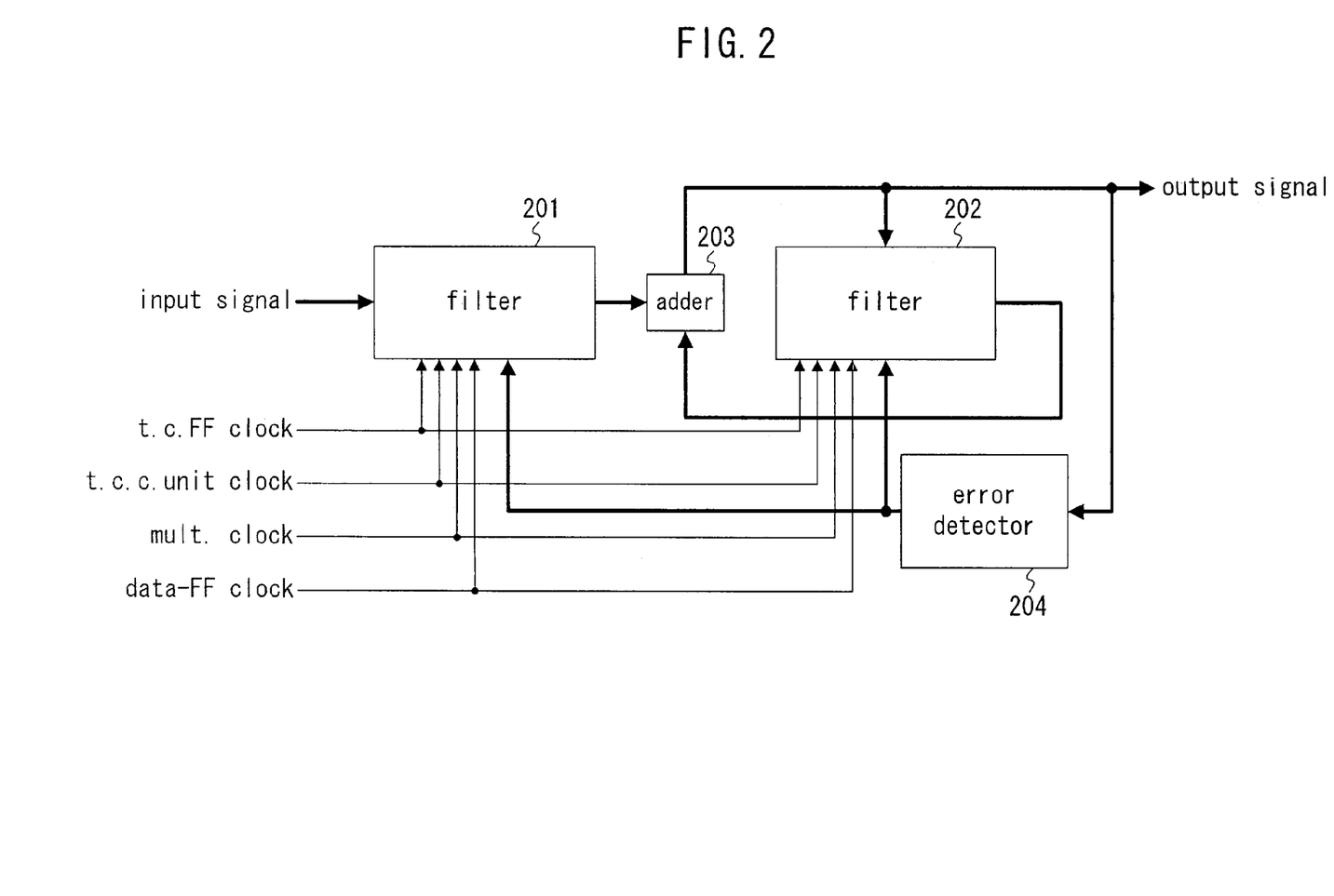
FIG. 2 is a diagram schematically showing a configuration of a waveform equalizer according to the embodiments of the present invention.

As shown in FIG. 2, the known waveform equalizer includes: a filter 201 for receiving a signal input to the waveform equalizer; an adder 203 for adding up signals from the filter 201 and a filter 202 and producing an output signal; the filter 202 for receiving the signal from the adder 203 and further outputting a signal to the adder 203; and an error detector 204 for detecting an error in response to the output signal from the adder 203 and outputting the error to the filters 201 and 202.

The filter 201 or 202 in the waveform equalizer includes n taps, i.e., tap 1 through tap n, as shown in FIG. 8. The tap 1 includes: a data storing flip-flop (data storing FF) 811 for receiving an input signal in synchronization with a rising edge of a data-FF clock and storing the signal; a tap coefficient computing unit 814 for calculating a tap coefficient in synchronization with a rising edge of a tap-coefficient-computing-unit clock; a tap coefficient storing flip-flop (tap coefficient storing FF) 812 for receiving a tap coefficient in synchronization with a rising edge of a tap-coefficient-FF clock and storing the tap coefficient; and a multiplier 813 for receiving an output signal from the data storing FF 811 and an output signal from the tap coefficient storing FF 812 in synchronization with a rising edge of a multiplier clock and for multiplying these two output signals together. The taps 2 through n have the same configuration as that of the tap 1 so that the signals subjected to multiplications by the multipliers in respective the taps 1 through n are added up by the adder 808, thereby producing an output signal.

In each tap coefficient computing unit, the tap coefficient for each tap is updated adaptively based on the least-mean-square (LMS) algorithm. Each of the tap coefficients is updated based on the following Equation 1

$$C_{i(m+1)} = C_{i(m)} - \alpha \times e_{(m)} \times d_i \qquad \text{Equation 1}$$

where i represents tap numbers 1 through n, $C_{i(m)}$ is the tap coefficient $C_i$ at the point when the $m^{th}$ update has been completed, $C_{i(m+1)}$ is the tap coefficient $C_i$ at the point when the $(m+1)^{th}$ update has been completed, $\alpha$ is a fixed constant called the step size, $e_{(m)}$ is the error contained in the output signal from the waveform equalizer at the point when the $m^{th}$ update of the tap coefficient has been completed, and $d_i$ is data held in the data storing FF at the point when the $m^{th}$ update of the tap coefficient has been completed.

Specifically, in the tap coefficient computing unit 814, for example, the tap coefficient $C_{1(m+1)}$ is determined by subtracting a number that is the product of the step size $\alpha$, which is a fixed constant obtained beforehand, the error $e_{(m)}$ output from the error detector 204 (shown in FIG. 2) and the data $d_i$ output from the data storing FF 811, from the tap coefficient $C_{1(m)}$ output from the tap coefficient storing FF 812. Inputs of these values into each tap coefficient computing unit is not shown in the drawings.

In this manner, by sequentially updating a tap coefficient in each of the taps based on the LMS algorithm, it is possible to obtain an output signal in which multipath interference caused in an input signal is reduced.

If the waveform equalizer as described above is used, it is possible to obtain a DTV signal in which multipath interference is reduced, but the following drawbacks occur.

In general, a tap coefficient is frequently updated in each tap for the purpose of increasing the convergence speed and tracking speed of waveforms. If the tap coefficient is frequently updated, the tap coefficient storing FF, the tap coefficient computing unit and the multiplier also operate frequently according to the interval of the update, thereby consuming a lot of electric power.

SUMMARY OF THE INVENTION

It is therefore an object of the present invention to provide a waveform equalizer and a shift register with small power consumption by taking measures for masking data or a clock to be input to components of the filter according to the value of a tap coefficient.

Specifically, a first waveform equalizer of the present invention is provided with at least one shift register including: a plurality of taps, each including an input unit for receiving an input signal, a tap coefficient update storing unit for updating a tap coefficient and storing the updated tap coefficient, and a multiplier for computing the product of the tap coefficient and the input signal; an adder for computing the total sum of the products computed in the plurality of taps; a comparator for comparing the absolute value of the tap coefficient to a threshold value, and producing a comparison result signal; and a masking unit for receiving the comparison result signal and, if the absolute value is smaller than the threshold value, replacing data for computing the total sum with a fixed value, the data being input to at least one of the input unit, the tap the coefficient update storing unit, the multiplier and the adder.

With this structure, if the absolute value of the tap coefficient is smaller than the threshold value, data to be input to the input unit, the tap the coefficient update storing unit, the multiplier and the adder can be replaced with a fixed value beforehand using the masking unit. Accordingly, data to be input to the input unit, the tap the coefficient update storing unit, the multiplier and the adder does not vary, thus obtaining a waveform equalizer with low power consumption.

The waveform equalizer may be used for digital broadcasting.

The input unit may have a function of holding the input signal, and an absolute value computing unit for calculating the absolute value may be further provided.

It is preferable that in a normal operation, the comparator produces an ON signal if the absolute value is smaller than the threshold value, and produces an OFF signal if the absolute value is larger than the threshold value, and that the masking unit replaces data for computing the total sum with the fixed value on receiving the ON signal, and does not replace data for computing the total sum on receiving the OFF signal.

The comparator may be shared among two or more of the taps, and the absolute value to be compared to the threshold value by the comparator may be the sum of the absolute values of the tap coefficients in said two or more taps. Then, the circuit configuration can be simplified, thus allowing further reduction in size of the resultant device.

The masking unit may replace the input signal to be input to the multiplier with the fixed value, if the absolute value is smaller than the threshold value. Then, the power consumption in the multiplier can be reduced.

The masking unit may replace the product to be input to the adder with the fixed value, if the absolute value is smaller than the threshold value. Then, the power consumption in the adder can be reduced.

A first shift register of the present invention includes: a plurality of taps, each including an input unit for receiving an input signal, a tap coefficient update storing unit for updating a tap coefficient and storing the updated tap coefficient, and a multiplier for computing the product of the tap coefficient and the input signal; an adder for computing the total sum of the products computed in the plurality of taps; a comparator for comparing the absolute value of the tap coefficient to a threshold value, and producing a comparison result signal; and a masking unit for receiving the comparison result signal and, if the absolute value is smaller than the threshold value, replacing data for computing the total sum with a fixed value, the data being input to at least one of the input unit, the tap coefficient update storing unit, the multiplier and the adder.

With this structure, if the absolute value of the tap coefficient is smaller than the threshold value, data to be input to the input unit, the tap the coefficient update storing unit, the multiplier and the adder can be replaced with a fixed value beforehand using the masking unit. Accordingly, data to be input to the input unit, the tap the coefficient update storing unit, the multiplier and the adder does not vary, thus obtaining a shift register with low power consumption.

A second waveform equalizer of the present invention is provided with at least one shift register including: a plurality of taps, each including an input unit for receiving an input signal, a tap coefficient update storing unit for updating a tap coefficient and storing the updated tap coefficient, and a multiplier for computing the product of the tap coefficient and the input signal; an adder for computing the total sum of the products computed in the plurality of taps; a comparator for comparing the absolute value of the tap coefficient to a threshold value, and producing a comparison result signal; and a masking unit for receiving the comparison result signal and, if the absolute value is smaller than the threshold value, blocking at least part of a clock signal to be input to at least one of the input unit, the tap coefficient update storing unit, the multiplier and the adder to which the tap coefficient is input.

With this structure, if the absolute value of the tap coefficient is smaller than the threshold value, at least part of a clock signal to be input to the input unit, the tap the coefficient update storing unit, the multiplier and the adder can be blocked by the masking unit. Accordingly, the clock to be input to the input unit, the tap the coefficient update storing unit, the multiplier and the adder does not vary, thus obtaining a waveform equalizer with low power consumption.

The waveform equalizer may be used for digital broadcasting.

The input unit may have a function of holding the input signal, and an absolute value computing unit for calculating the absolute value may be further provided.

It is preferable that in a normal operation, the comparator produces an ON signal if the absolute value is smaller than the threshold value, and produces an OFF signal if the absolute value is larger than the threshold value, and that the masking unit blocks at least part of the clock signal on receiving the ON signal, and does not block the clock signal on receiving the OFF signal.

The masking unit may receive a test mode signal functioning as an ON signal at least in a test operation, and does not block the clock signal on receiving the test mode signal. Then, no masking operation is performed in, for example, a specific test operation, so that a test operation or the like can be performed accurately.

The comparator may be shared among two or more of the taps, and the absolute value, which is compared to the threshold value by the comparator, may be the sum of the absolute values of the tap coefficients in said two or more taps. Then, the circuit configuration can be simplified, thus allowing further reduction in size of the resultant device.

The masking unit may block at least part of a clock signal to be input to the multiplier based on the comparison result signal. Then, the power consumption in the multiplier can be reduced.

The tap coefficient update storing unit may include a tap coefficient updating unit for calculating the tap coefficient and a plurality of tap coefficient storing units for dividing the tap coefficient into partial tap coefficients and storing the respective partial tap coefficients therein. At least one of the tap coefficient storing units may be a first tap coefficient storing unit to which the clock signal is always input. Each of the rest of the tap coefficient storing units may be a second tap coefficient storing unit, to which input of a clock signal is blockable at least in part by the masking unit having received the comparison result signal. Then, a clock signal to be input to the tap coefficient storing unit is not blocked completely and is reduced, thus allowing reduction in power consumption.

The comparator, the masking unit and the second tap coefficient storing unit may be each provided in the same number, the comparator, the masking unit and the second tap coefficient storing unit being in correlation. The comparator may compare the respective absolute values of the partial tap coefficients to the threshold value. The masking unit may be capable of blocking a clock signal to be input to the correlational second tap coefficient storing unit.

The tap coefficient update storing unit may include: a plurality of tap coefficient updating units for calculating respective partial tap coefficients into which the tap coefficient has been divided; and a tap coefficient storing unit for recording the tap coefficient therein. At least one of the tap coefficient updating units may be a first tap coefficient updating unit to which a clock signal is always input. Each of the rest of the tap coefficient updating units may be a second tap coefficient updating unit, to which input of a clock signal is blockable at least in part by the masking unit having received the comparison result signal. Then, a clock signal to be input to the tap coefficient storing unit is not blocked completely and is reduced, thus allowing reduction in power consumption.

The comparator, the masking unit and the second tap coefficient updating unit may be each provided in the same number, the comparator, the masking unit and the second tap coefficient updating unit being in correlation. The comparator may compare the respective absolute values of the partial tap coefficients to the threshold value. The masking unit may block a clock signal so that the clock signal is not input to the correlational second tap coefficient updating updating unit.

A second shift register of the present invention includes: a plurality of taps, each including an input unit for receiving an input signal and a tap coefficient update storing unit for updating a tap coefficient and storing the updated tap coefficient therein; a multiplier for computing the product of the tap coefficient and the input signal; an adder for computing the total sum of the products computed in the plurality of taps; a comparator for comparing the absolute value to a threshold value, and producing a comparison result signal; and a masking unit for receiving the comparison result signal and, if the absolute value is smaller than the threshold value, blocks at least part of a clock signal to be input to at least one of the input unit, the tap coefficient update storing unit, the multiplier and the adder to which the tap coefficient is input.

With this structure, if the absolute value of the tap coefficient is smaller than the threshold value, at least part of a clock signal to be input to the input unit, the tap the coefficient update storing unit, the multiplier and the adder can be replaced with a fixed value beforehand using the masking unit. Accordingly, the clock to be input to the input unit, the tap the coefficient update storing unit, the multiplier and the adder does not vary, thus obtaining a shift register with low power consumption.

DESCRIPTION OF THE PREFERRED EMBODIMENTS

Structure of Waveform Equalizer

FIG. 2 is a diagram schematically showing a configuration of a waveform equalizer according to the embodiments of the present invention. The waveform equalizer of the embodiments includes: a filter 201 for receiving a signal input to the waveform equalizer; an adder 203 for adding up output signals from the filter 201 and a filter 202 and producing an output signal; the filter 202 for receiving the signal from the adder 203 and outputting a signal to the adder 203; and an error detector 204 for detecting an error in response to the output from the adder 203 and outputting the error to the filters 201 and 202.

In each of the following first through sixth embodiments, a configuration of a filter that is a component of the waveform equalizer will be described.

Embodiment 1

Figure 1:
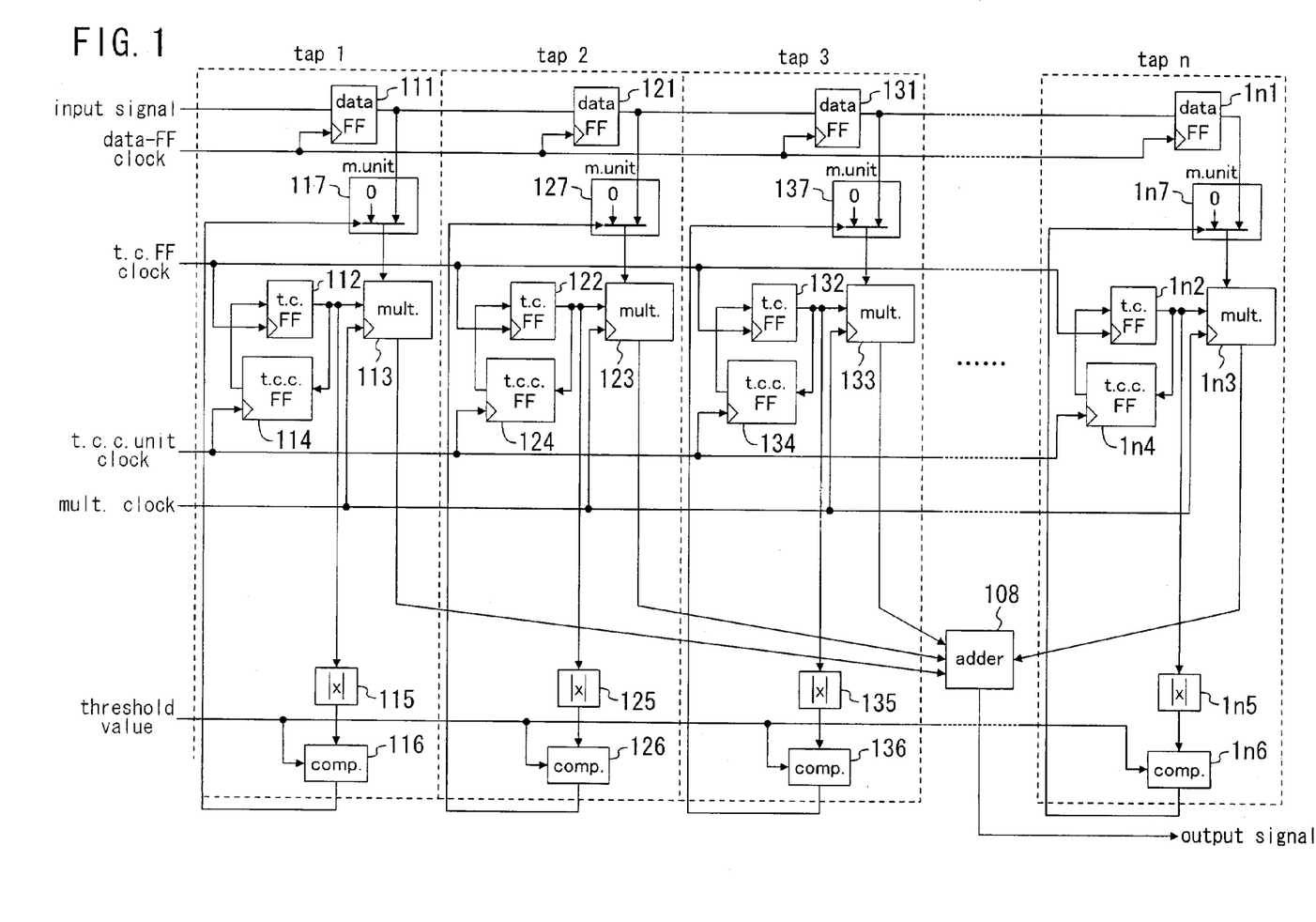
FIG. 1 is a circuit diagram showing a configuration of a filter according to a first embodiment of the present invention.

Hereinafter, a filter (a shift register) according to a first embodiment of the present invention will be described with reference to FIG. 1. FIG. 1 is a circuit diagram showing a configuration of a filter of the first embodiment.

The filter of this embodiment corresponds to the filter 201 or 202 shown in FIG. 2 and includes: n taps, i.e., tap 1 through tap n, each having substantially the same configuration; and an adder 108. Only components in the tap 1 or 2 are herein described as an example for the sake of simplicity. However, the description thereof is applicable to components in the other taps.

The tap 1 of the filter of this embodiment includes: a data storing flip-flop (data storing FF) 111 for recording an input signal; a tap coefficient computing unit (or t.c.c.unit) 114 for calculating a tap coefficient $C_1$; an absolute value computing unit 115 for computing the absolute value of the tap coefficient $C_1$; a tap coefficient storing flip-flop (tap coefficient storing FF or t.c.FF) 112 for storing the tap coefficient $C_1$; a comparator (or comp.) 116 for comparing the absolute value of the tap coefficient $C_1$ to a threshold value; a masking unit (or m.unit) 117 for masking an output signal from the data storing FF 111 according to an output signal from the comparator 116; and a multiplier (or mult.) 113 for multiplying an output signal from the masking unit 117 and the tap coefficient $C_1$ together. The taps 2 through n have the same configuration so that signals subjected to multiplications by the multipliers 113 through 1n3 in respective taps are added up by the adder 108 to be output to the outside of the filter.

Hereinafter, it will be described how the filter of this embodiment operates with reference to FIGS. 1 and 2.

As shown in FIG. 1, an input signal that has reached the filter of this embodiment is input to the taps 1 through n and processed therein in the same manner. In the tap 1, for example, the input signal is received by the data storing FF 111 in synchronization with a rising edge of a data-FF clock and is stored therein.

On the other hand, the tap coefficient computing unit 114 calculates a tap coefficient $C_1$ based on an LMS algorithm in synchronization with a rising edge of a tap-coefficient-computing-unit clock. The calculated tap coefficient $C_1$ is received by the tap coefficient storing FF 112 in synchronization with a rising edge of a tap-coefficient-FF clock and is recorded therein.

The tap coefficient computing unit 114 calculates the tap coefficient $C_1$ based on following Equation 1 and updates the tap coefficient $C_1$ adaptively.

$$C_{i(m+1)} = C_{i(m)} - \alpha \times e_{(m)} \times d_i \quad \text{Equation 1}$$

where $C_{i(m)}$ is the tap coefficient $C_i$ at the point when the $m^{th}$ update has been completed, $C_{i(m+1)}$ is the tap coefficient $C_i$ at the point when the $(m+1)^{th}$ update has been completed, $\alpha$ is a fixed constant called the step size, $e_{(m)}$ is the error contained in the output signal from the waveform equalizer at the point when the $m^{th}$ update of the tap coefficient $C_i$ has been completed, and $d_i$ is the data held in the data storing FF at the point when the $m^{th}$ update of the tap coefficient $C_i$ has been completed.

As can seen from Equation 1, the tap coefficient $C_{i(m+1)}$ is calculated using a tap coefficient $C_{i(m)}$ recorded in the tap coefficient storing FF. Specifically, the tap coefficient $C_{1(m+1)}$ is determined by subtracting a number that is the product of the step size $\alpha$, which is a fixed constant input from the outside, the error $e_{(m)}$ output from the error detector 204 (shown in FIG. 2) and the data $d_1$ output from the data storing FF 111, from the tap coefficient $C_{1(m)}$ output from the tap coefficient storing FF 112. Inputs of these values to each of the tap coefficient computing units 114 through 1n4 are not shown in the drawing.

The step size $\alpha$ may be held in each of the tap coefficient computing units beforehand. In addition, a method for calculating the tap coefficient $C_1$ in the tap coefficient computing unit 114 is not limited to the method described above.

The tap coefficient $C_1$ recorded in the tap coefficient storing FF 112 is output to the absolute value computing unit 115 and the multiplier 113. The absolute value computing unit 115 calculates the absolute value of the tap coefficient $C_1$ and outputs the calculated absolute value to the comparator 116. The comparator 116 compares the absolute value of the tap coefficient $C_1$ output from the absolute value computing unit 115 to a threshold value and outputs a signal "1" if the absolute value is equal to or larger than the threshold value, while outputting a signal "0" if the absolute value is smaller than the threshold value. Alternatively, the signal "1" may be output if the absolute value is larger than the threshold value and the signal "0" may be output if the absolute value is equal to or smaller than the threshold value.

The output signal from the comparator 116 is input to the masking unit 117. The masking unit 117 masks a signal received from the data storing FF 111 according to the value of the output signal from the comparator 116, thereby outputting a signal to the multiplier 113. Specifically, the masking unit 117 outputs the signal from the data storing FF 111 without change if the output signal from the comparator 116 is "1" while outputting the signal from the data storing FF 111 that has been replaced with a signal "0" if the output signal from the comparator 116 is "0".

The multiplier 113 multiplies the output signal from the masking unit 117 by an output signal from the tap coefficient storing FF 112 in synchronization with a rising edge of a multiplier clock, so that the product resulting from the multiplication is output to the adder 108. At this time, if the absolute value of the tap coefficient $C_1$ is smaller than a threshold value, the output signal from the masking unit 117 to the multiplier 113 is "0", so that the multiplier 113 does not operate.

On the other hand, if the absolute value of the tap coefficient $C_1$ is equal to or larger than the threshold value, a data signal is output from the masking unit 117 to the multiplier 113, thereby multiplying the tap coefficient $C_1$ and the data signal together. The series of operations described above is performed in the same manner in the taps 2 through n.

In the known technique, if tap coefficients $C_1$ are input to an adder, data varies uniformly. On the other hand, in this embodiment, if a tap coefficient $C_1$ having such a small absolute value that has no effect on the adder 108 is calculated, data is masked beforehand by the masking unit 117 in the tap, so that data for the multiplier 113 does not vary. Since most of the absolute values of calculated tap coefficients $C_1$ are generally small, the power consumption in the multiplier 113 can be greatly reduced in the present invention.

In this embodiment, a masking operation is performed when the polarity of the comparator 116 is "0", but the present invention is not limited to this polarity. In addition, though "0" is used for replacing the signal to be input to the multiplier, other values may be used so long as they are fixed constants.

In this embodiment, a tap coefficient is input from the tap coefficient storing FF 112 to the absolute value computing unit 115. Alternatively, the tap coefficient may be input from the tap coefficient computing unit 114 to the absolute value computing unit 115 in the present invention. In addition, a tap coefficient is input from the tap coefficient storing FF 112 to the multiplier 113 in this embodiment. Alternatively, the tap coefficient may be input from the tap coefficient computing unit 114 to the multiplier 113 in the present invention.

Embodiment 2

Figure 3:
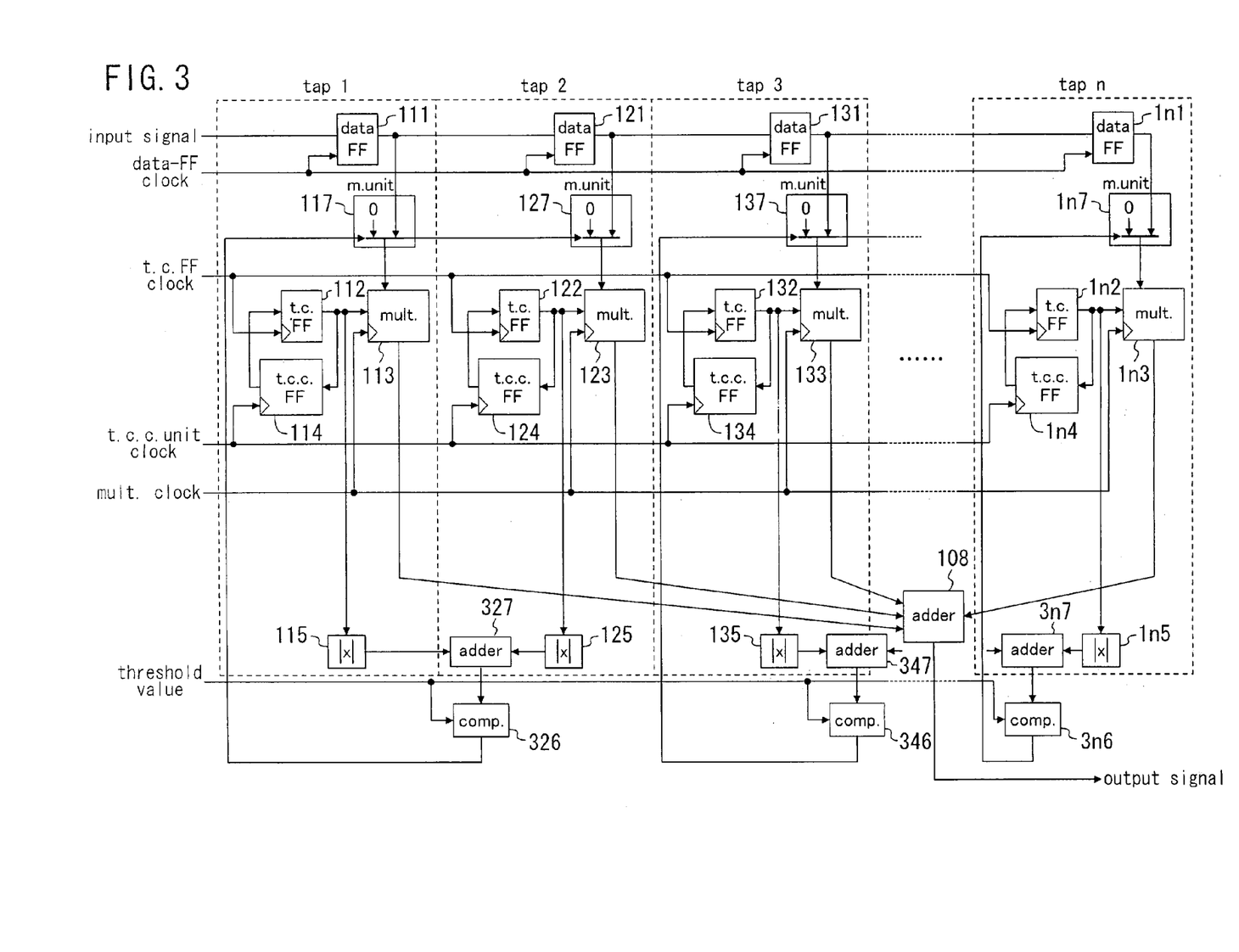
FIG. 3 is a circuit diagram showing a configuration of a filter according to a second embodiment of the present invention.

Hereinafter, a filter according to a second embodiment of the present invention will be described with reference to FIG. 3. FIG. 3 is a circuit diagram showing a configuration of the filter of this embodiment.

As shown in FIG. 3, the filter of this embodiment is different from that of the first embodiment in that a comparator is not provided in each tap but a comparator 326 is shared between two taps and that an adder 327 for adding up the tap coefficients of these two taps to be input to the comparator 326 is provided.

In the operation of the filter of this embodiment, an output signal from the absolute value computing unit 115 is not compared to a threshold value by a comparator provided in each tap. Instead, output signals from absolute value computing units in the respective taps 1 and 2 are added up by the adder 327 shared between the taps 1 and 2, and then the sum is compared to a threshold value by the comparator 326. In this case, the comparator 326 compares the sum of the absolute values of a plurality of tap coefficients $C_1$, $C_2$ obtained by the adder 327 to the threshold value, and outputs a signal "1" if the sum is equal to or larger than the threshold value, while outputting a signal "0" if the sum is smaller than the threshold value.

The output signal from the comparator 326 is input to masking units 117 and 127 in the respective taps 1 and 2 that share the comparator 326. The masking unit 117 outputs a signal from the data storing FF 111 to the multiplier 113 without change if the output signal from the comparator 326 is "1", while outputting, to the multiplier 113, the signal from the data storing FF 111 that has been replaced with a signal "0" if the output signal from the comparator 326 is "0". The masking unit 127 in the tap 2 also performs the same operation according to the output signal from the comparator 326 and outputs a signal to the multiplier 123. The other part of the configuration and the other operations are the same as those in the first embodiment, and the descriptions thereof are omitted herein. The series of operations described above is performed in the same manner in the taps 3 through n.

In this embodiment, while the sum of the absolute values of the tap coefficients $C_1$, $C_2$ in the respective taps 1 and 2 is smaller than a threshold value, the output signals to the multipliers 113 and 123 are "0", so that the multipliers 113 and 123 do not operate. Specifically, if a tap coefficient $C_1$ having such a small absolute value that has no effect on the adder 108 is calculated in the tap 1 and a tap coefficient $C_2$ having such a small absolute value that has no effect on the adder 108 is calculated in the tap 2, data is masked by the masking units 117 and 127 beforehand, so that inputs to the multipliers 113 and 123 can be set constant.

Since most of the absolute values of the calculated tap coefficients $C_1$ are generally small in a waveform equalizer, the power consumption in the multiplier 113 can be reduced largely in the present invention. In addition, the adder 327 and the comparator 326 are shared among a plurality of taps, so that the circuit configuration can be simplified and the resultant device can be downsized.

In this embodiment, a masking operation is performed when the polarity of the comparator 326 is "0", but the present invention is not limited to this polarity. In addition, though "0" is used for replacing the signal to be input to the multiplier, other values may be used so long as they are fixed constants.

In this embodiment, a pair of adder and comparator is shared between two taps. Alternatively, a pair of adder and comparator may be shared among three or more taps in the present invention.

In this embodiment, for the purpose of sharing a comparator among two or more taps, an adder for adding up tap coefficients $C_1$ to be input to the comparator is provided. However, the adder is not necessarily provided in the present invention.

Embodiment 3

Figure 4:
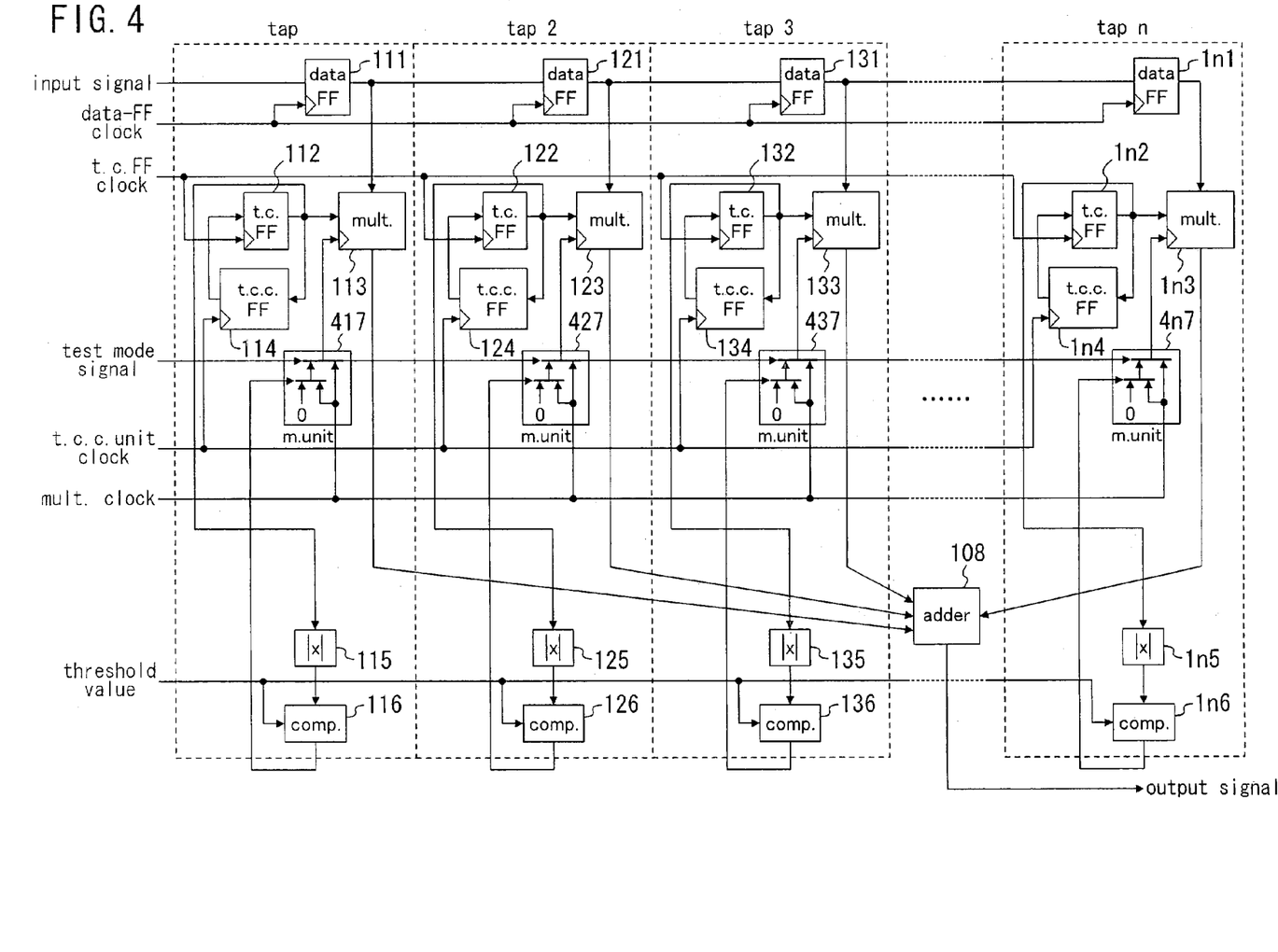
FIG. 4 is a circuit diagram showing a configuration of a filter according to a third embodiment of the present invention.

Hereinafter, a filter according to a third embodiment of the present invention will be described with reference to FIG. 4. FIG. 4 is a circuit diagram showing a configuration of the filter of the third embodiment.

As shown in FIG. 4, the filter of this embodiment is different from that of the first embodiment in that a masking unit 417 is not provided to mask data to be input from the data storing FF 111 to the multiplier 113 but is provided to mask a multiplier clock to be input to the multiplier 113.

In the operation of the filter of this embodiment, the masking unit 417 masks a multiplier clock, according to a test mode signal input from outside of the tap and a signal "0" or "1" input from the comparator 116. Specifically, if the test mode signal is "1" representing a normal operation, and the input signal from the comparator 116 is "1", the multiplier clock is output to the multiplier 113 without change. If the test mode signal is "1" and the input signal from the comparator 116 is "0", the multiplier clock that has been replaced with a signal "0" is input to the multiplier 113. On the other hand, if the test more signal is "0" representing a specific test mode, the multiplier clock is input to the multiplier 113 without change, irrespective of the output from the comparator 116. The other part of the configuration and the other operations are the same as those in the first embodiment, and the descriptions thereof are omitted herein. The series of operations described above is performed in the same manner in the taps 2 through n.

In this embodiment, the test mode signal is input from the outside, so that a masking operation is performed according to the absolute value of the tap coefficient $C_1$ in a normal operation, while no masking operation is performed in a specific test operation such as a performance test or a circuit test. Specifically, in a normal operation, if a tap coefficient $C_1$ having such a small absolute value that has no effect on the adder 108 is calculated in the tap 1, the multiplier clock is masked beforehand by the masking unit 417, so that the input to the multiplier 113 can be set constant. On the other hand, in a test operation, the multiplier clock not subjected to a masking operation is input to the multiplier 113, irrespective of the absolute value of the calculated tap coefficient $C_1$, and thus the test operation can be performed more accurately. Therefore, the power consumption can be reduced, and moreover, the efficiency in a test such as failure detection for a circuit can be improved.

Since most of the absolute values of the calculated tap coefficients $C_i$ are generally small in a waveform equalizer, the power consumption can be greatly reduced in the present invention. A computing unit such as a multiplier consumes electric power just by variation in a clock, irrespective of variation in input data. Therefore, according to the present invention, electric power consumed by the multiplier 113 can be largely reduced, as compared to the known technique in which a clock for a multiplier always varies.

In this embodiment, a masking operation is performed when the polarity of the comparator 116 is "0", but the present invention is not limited to this polarity. In addition, though "0" is used for replacing a clock to be input to the multiplier, other values may be used so long as they are fixed constants.

It is assumed that an operation in which the test mode signal exhibits the polarity "1" is a normal operation in this embodiment. However, the present invention is not limited to this polarity.

In addition, the comparator 116 may be shared among two or more taps, as described in the second embodiment.

Embodiment 4

Figure 5:
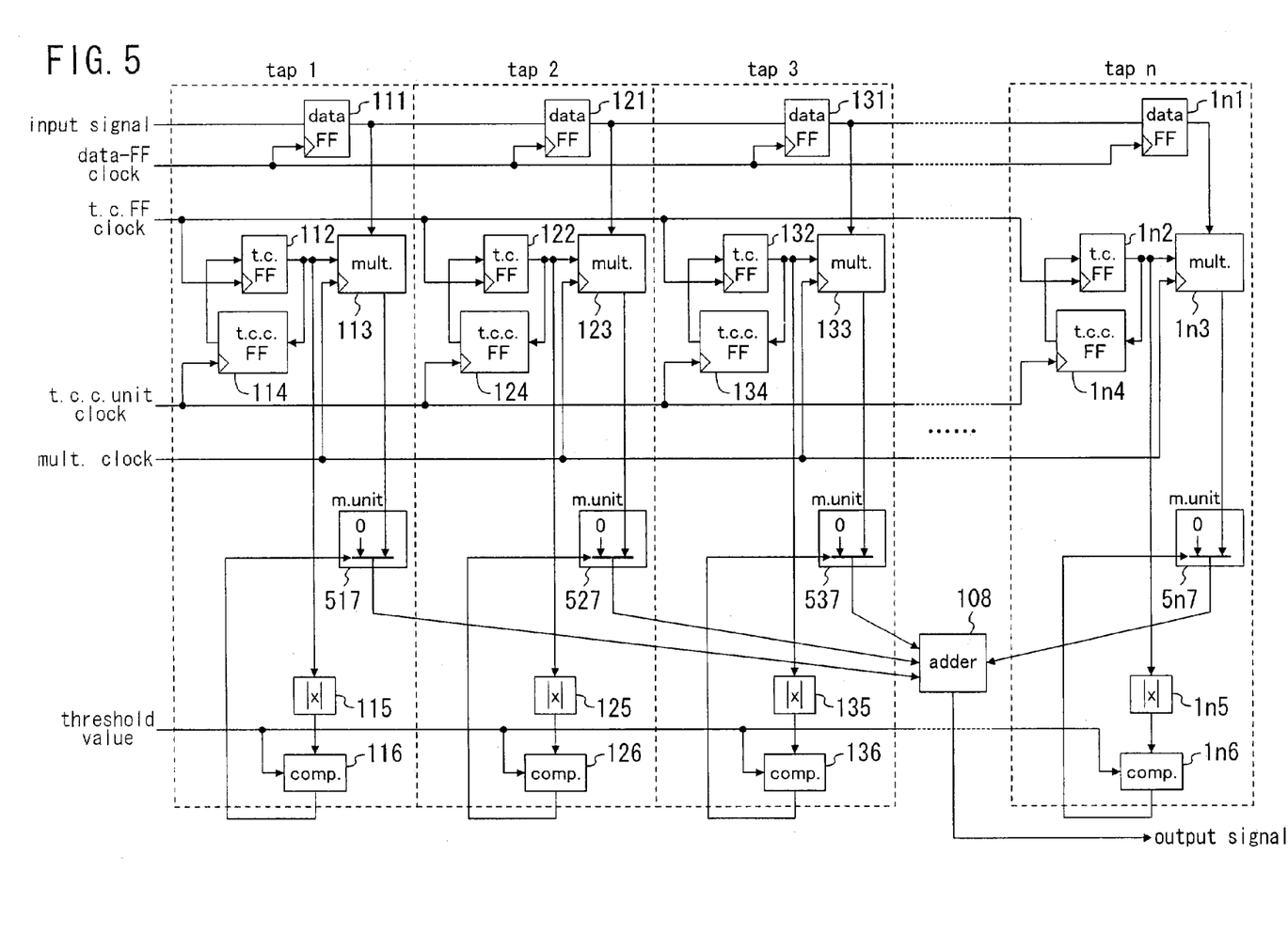
FIG. 5 is a circuit diagram showing a configuration of a filter according to a fourth embodiment of the present invention.

Hereinafter, a filter according to a fourth embodiment of the present invention will be described with reference to FIG. 5. FIG. 5 is a circuit diagram showing a configuration of the filter of the fourth embodiment.

As shown in FIG. 5, the filter of this embodiment is different from that of the first embodiment in that a masking unit 517 is provided to mask a signal output from the multiplier 113.

In the operation of the filter of this embodiment, the multiplier 113 multiplies an output signal from the data storing FF 111 and an output signal from the tap coefficient storing FF 112 together, so that the result of the multiplication is input to the masking unit 517. The masking unit 517 masks a signal from the multiplier 113 according to the value of an output signal from the comparator 116 and then outputs the result to the adder 108 shared among the taps 1 through n. Specifically, the masking unit 517 outputs the signal from the multiplier 113 without change if the output signal from the comparator 116 is "1", while outputting the signal from the multiplier 113 that has been replaced with a signal "0" if the output signal from the comparator 116 is "0". The other part of the configuration and the other operations are the same as those in the first embodiment, and the descriptions thereof are omitted herein. The series of operations described above is performed in the same manner in the taps 2 through n.

In this embodiment, if a tap coefficient $C_1$ having such a small absolute value that has no effect on the adder 108 is calculated in the tap 1, the output from the multiplier 113 is masked by the masking unit 517, so that an input to the adder 108 from the tap 1 can be set constant.

Since most of the absolute values of the calculated tap coefficients $C_i$ are generally small in a waveform equalizer, a large part of a signal to be input to the adder 108 can be masked in the present invention. As a result, the power consumption in the adder 108 can be reduced largely in the present invention.

In this embodiment, a masking operation is performed when the polarity of the comparator 116 is "0", but the present invention is not limited to this polarity. In addition, though "0" is used for replacing the signal to be input to the adder, other values may be used so long as they are fixed constants.

Further, the comparator 116 may be shared among two or more taps, as described in the second embodiment.

Embodiment 5

Figure 6:
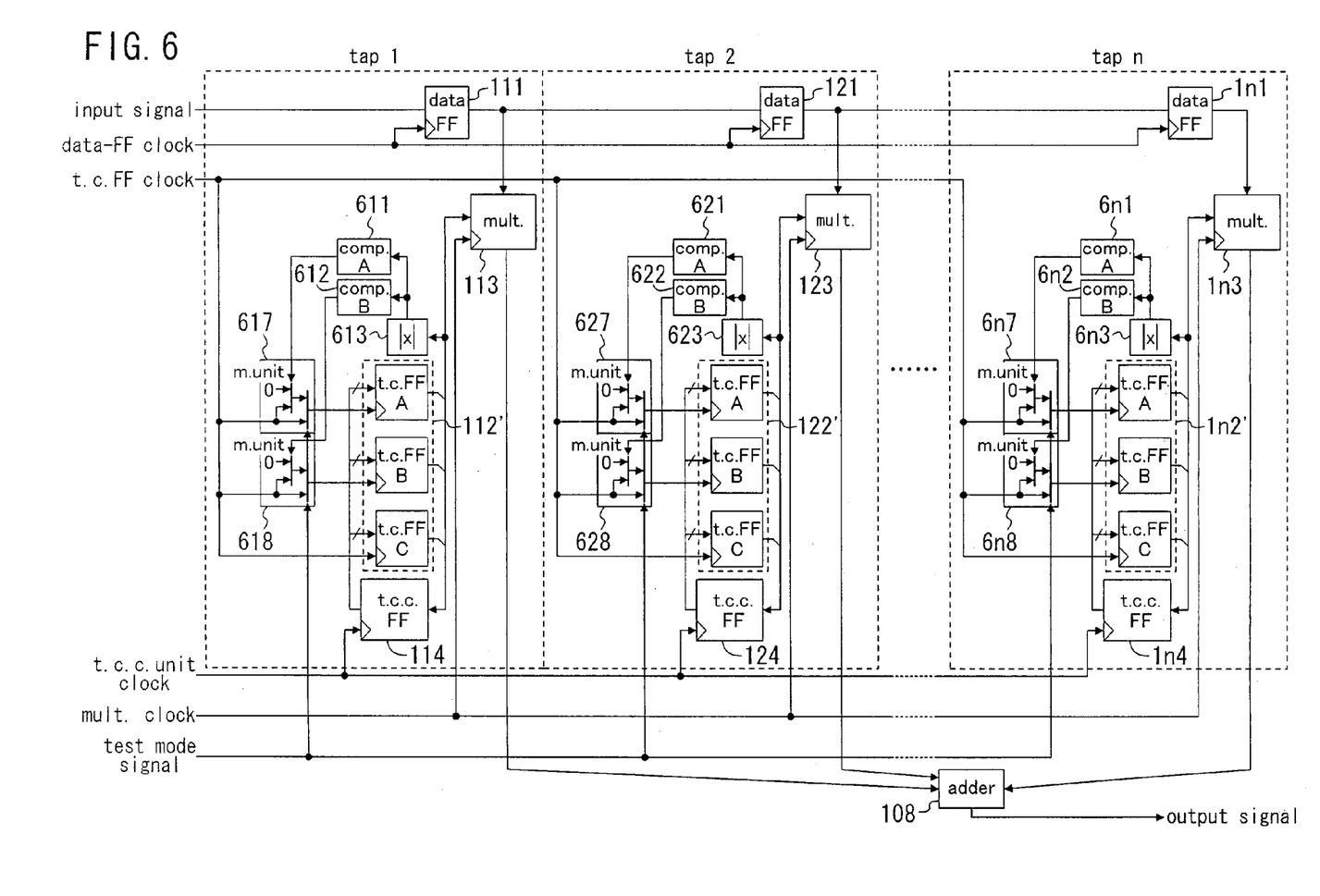
FIG. 6 is a circuit diagram showing a configuration of a filter according to a fifth embodiment of the present invention.

Hereinafter, a filter according to a fifth embodiment of the present invention will be described with reference to FIG. 6. FIG. 6 is a circuit diagram showing a configuration of the filter of this embodiment.

The filter of this embodiment corresponds to the filter 201 or 202 in FIG. 2, and includes: n taps, i.e., tap 1 through tap n, each having substantially the same configuration; and an adder, as shown in FIG. 6.

The tap 1 of the filter of this embodiment includes: the data storing FF 111 for recording an input signal therein; the tap coefficient computing unit 114 for calculating a tap coefficient $C_1$; a tap coefficient storing flip-flops (tap coefficient storing FF) 112' which hold the tap coefficient and are made up of a flip-flop A (FFA), a flip-flop B (FFB) and a flip-flop C (FFC); the multiplier 113 for multiplying an output from the tap coefficient storing FF 112' and an output from the data storing FF 111 together; an absolute value computing unit 613 for obtaining the absolute value of the tap coefficient $C_1$; a comparator 611 for comparing the absolute value of the tap coefficient $C_1$ to a threshold value; a comparator 612; a masking unit 617 for masking a tap-coefficient-FF clock based on the comparison result from the comparator 611 and outputting a signal to the FFA; and a masking unit 618 for masking a tap-coefficient-FF clock based on the comparison result from the comparator 612 and outputting a signal to the FFB. The taps 2 through n have the same configuration as the tap 1 so that signals resulting from multiplications by the multipliers 113 through 1n3 in the respective taps are added up by the adder 108 and the sum is output to the outside of the filter.

Hereinafter, it will be described how the filter of this embodiment operates with reference to FIG. 6.

As shown in FIG. 6, an input signal that has reached the filter of this embodiment is input to the taps 1 through n and processed therein in the same manner. In the tap 1, for example, the input signal is received by the data storing FF 111 in synchronization with a rising edge of a data-FF clock and is stored therein.

On the other hand, the tap coefficient computing unit 114 calculates a tap coefficient $C_1$ based on an LMS algorithm in synchronization with a rising edge of a tap-coefficient-computing-unit clock.

The tap coefficient computing unit 114 calculates the tap coefficient $C_1$ using Equation 1, which is also used in the first embodiment, and in which i represents tap numbers 1 through n, $C_{i(m)}$ is the tap coefficient $C_i$ at the point when the $m^{th}$ update has been completed, and $C_{i(m+1)}$ is the tap coefficient $C_i$ at the point when the $(m+1)^{th}$ update has been completed. The tap coefficient $C_{i(m+1)}$ is calculated based on the tap coefficient $C_{i(m)}$.

At the point when the tap coefficient $C_{1(m+1)}$ for the $(m+1)^{th}$ update is calculated, the tap coefficient $C_{1(m)}$ is recorded in the tap coefficient storing FF 112' made up of the FFA, FFB and FFC. Specifically, the tap coefficient $C_{1(m)}$ is divided among the FFA through FFC. Part of the tap coefficient $C_1$ at a most-significant-bit (MSB) side is recorded in the FFA, part of the tap coefficient $C_1$ at a least-significant-bit (LSB) side is recorded in the FFC and the other part of the tap coefficient $C_1$ is recorded in the FFB.

In this case, the tap coefficient $C_{1(m)}$ is recorded in different flip-flops in the tap coefficient storing FF 112' according to the value (absolute value) thereof Specifically, there are three cases: a case where the tap coefficient $C_{1(m)}$ is divided among the FFA through FFC constituting the tap coefficient storing FF 112' and respectively recorded therein; a case where the tap coefficient $C_{1(m)}$ is recorded only in the FFC; and a case where the tap coefficient $C_{1(m)}$ is recorded in the FFC and the FFB. In these cases, if one of the FFA through FFC in the tap coefficient storing FF 112' does not store a tap coefficient $C_1$, it receives no data.

The tap coefficient $C_{1(m)}$ held in the FFA through FFC is output to the tap coefficient computing unit 114 for the purpose of calculating the tap coefficient $C_{1(m+1)}$ and is also output to the absolute value computing unit 613. The absolute value computing unit 613 calculates the absolute value of tap coefficient $C_{1(m)}$ and outputs the calculated absolute value to the comparators 611 and 612.

Each of the comparators 611 and 612 compares the absolute value calculated by the absolute value computing unit 613 to a threshold value, and outputs a signal "1" if the absolute value is equal to or larger than the threshold value, while outputting a signal "0" if the absolute value is smaller than the threshold value. A signal from the comparator 611 is input to the masking unit 617, and a signal from the comparator 612 is input to the masking unit 618.

The masking unit 617 performs a masking operation according to a test mode signal input from outside of the tap and a signal "0" or "1" input from the comparator 611.

Specifically, if the test mode signal is "1", which represents a normal operation, and the input signal from the comparator 611 is "1", the masking unit 617 outputs a tap-coefficient-FF clock to the FFA without change. If the test mode signal is "1" and the input signal from the comparator 611 is "0", the masking unit 617 outputs the tap-coefficient-FF clock that has been replaced with a signal "0". On the other hand, the test mode signal is "0", which represents a specific test mode, a tap-coefficient-FF clock is output without change, irrespective of the output from the comparator 611.

As the masking unit 617, the masking unit 618 masks the tap-coefficient-FF clock according to a test mode signal input from outside of the tap and a signal "0" or "1" input from the comparator 612 and outputs a signal to the FFB.

Specifically, among the FFA through FFC constituting the tap coefficient storing FF 112', the tap coefficient $C_{1(m+1)}$ calculated by the tap coefficient computing unit 114 is received by the FFA in synchronization with a rising edge of the tap-coefficient-FF clock input through the masking unit 617 and is held therein.

In the same manner, a tap-coefficient-FF clock is input to the FFB through the masking unit 618. That is to say, the tap-coefficient-FF clock is always input to the FFC without change.

In this case, the tap coefficient $C_{1(m+1)}$ is held in different ones of the FFA through FFC according to the value (absolute value) thereof Specifically, there are three cases: a case where the tap coefficient $C_{1(m+1)}$ is divided among the FFA through FFC and stored therein respectively; a case where the tap coefficient $C_{1(m+1)}$ is held only in the FFC; and a case where the tap coefficient $C_{1(m+1)}$ is divided between the FFB and the FFC and stored therein.

In a normal operation, if the tap coefficient $C_{1(m+1)}$ is divided among the FFA through FFC and held therein, tap-coefficient-FF clocks are input to the FFA through FFC. If the tap coefficient $C_{1(m+1)}$ is held only in the FFC, tap-coefficient-FF clocks are masked by the masking units 618 and 617 and are not input to the FFA and the FFB but are input to the FFC. If the tap coefficient $C_{1(m+1)}$ is divided between the FFB and the FFC, tap-coefficient-FF clocks are masked by the masking unit 617 and are input not to the FFA but to the FFB and the FFC.

The tap coefficient $C_1$ held in the FFA through FFC constituting the tap coefficient storing FF 112' is input to the multiplier 113. The multiplier 113 multiplies the tap coefficient $C_1$ and an output signal from the data storing FF 111 together in synchronization with a rising edge of a multiplier clock, and the product is output to the adder 108. The series of operations described above is performed in the same manner in the taps 2 through n.

Hereinafter, it will be described how the threshold value for each of the comparators 611 and 612 is set.

In this embodiment, when the tap coefficient $C_{1(m+1)}$ at the point when the $(m+1)^{th}$ update has been completed is input to the tap coefficient storing FF 112', whether or not the tap-coefficient-FF clock is input to each of the FFA through FFC depends on the result of the comparison between the tap coefficient $C_{1(m)}$ at the point where the $m^{th}$ update has been completed and a threshold value. Accordingly, it is necessary to set the threshold value to be compared to the tap coefficient $C_{1(m)}$ by the comparator 611 or 612 in consideration of the upper limit of the difference that may occur between the tap coefficients $C_{1(m)}$ and $C_{1(m+1)}$. In general, the tap coefficient $C_1$ gradually varies with the number of updates in most cases, and is not likely to change greatly between the $m^{th}$ update and the $(m+1)^{th}$ update. Accordingly, it is possible to set the threshold value in such a manner.

Specifically, even if the tap coefficient $C_{1(m)}$ is lower than the range of the LSB and the tap coefficients $C_{1(m+1)}$ exceeds the range of the LSB, the comparator 612 sets the threshold value such that a signal "1" is output. In this manner, a tap-coefficient-FF clock is input to the FFB without being masked by the masking unit 618. Accordingly, part of the tap coefficients $C_{1(m+1)}$ that exceeds the range of the LSB can be held.

By setting the threshold value in the manner described above, the FFA through FFC in the tap coefficient storing FF 112' to which data of the tap coefficients $C_{1(m+1)}$ is input always receives a tap-coefficient-FF clock.

In other words, the comparator 611 compares the tap coefficients $C_{1(m)}$ to the threshold value, thereby outputting a signal "0" in the case where it can be determined that the tap coefficients $C_{1(m+1)}$ is smaller than the range of values corresponding to the MSB, while outputting a signal "1" in the other cases. On the other hand, the comparator 612 compares the tap coefficients $C_{1(m)}$ to the threshold value, thereby outputting a signal "0" in the case where it can be determined that the tap coefficients $C_{1(m+1)}$ is smaller than the range of values corresponding to the LSB, while outputting a signal "1" in the other cases.

In this embodiment, the test mode signal is input from outside, so that a masking operation is performed according to the absolute value of the tap coefficient $C_1$ in a normal operation, while no masking operation is performed in a specific test operation such as a performance test. Specifically, in a normal operation, tap-coefficient-FF clocks to be input to the FFA through FFC constituting the tap coefficient storing FF 112' are masked according to the value of the tap coefficient $C_i$, and in a test operation, tap-coefficient-FF clocks are input to the FFA through FFC without being masked, irrespective of the value of the tap coefficient $C_1$.

In the known technique, a tap-coefficient-FF clock is always input to a tap coefficient storing FF, irrespective of a calculated tap coefficient $C_1$. On the other hand, in this embodiment, each of the comparators 611 and 612 makes a comparison beforehand to determine in which one of the FFA through FFC constituting the tap coefficient storing FF 112' the tap coefficient $C_1$ is to be held. Based on the comparison, each of the masking units 617 and 618 masks a tap-coefficient-FF clock. In this manner, it is possible to have a clock not input to a flip-flop in the tap coefficient storing FF 112' in which the tap coefficient $C_1$ is not held (i.e., in which data does not vary upon the input of the tap coefficient $C_1$). Accordingly, the power consumption in the tap coefficient storing FF 112' can be reduced. In addition, in a specific test operation, the tap coefficient $C_1$ is input to the tap coefficient storing FF 112' without being masked, thus improving the efficiency in a test such as failure detection for a circuit.

Most of the absolute values of the calculated tap coefficients $C_i$ are generally small in a waveform equalizer. In addition, a memory such as a tap coefficient storing FF consumes electric power in some degree just by receiving a clock signal, irrespective of the presence of the variation in input data such as a tap coefficient $C_i$. However, as compared to the known technique in which a clock signal is always input to a tap coefficient storing FF, the present invention allows a large reduction in power consumption.

In this embodiment, a masking operation is performed when the polarity of the comparators 611 and 612 is "0", but the present invention is not limited to this polarity. In addition, though "0" is used for replacing inputs to the FFA and the FFB, other values may be used so long as they are fixed constants.

It is assumed that the operation in which the test mode signal exhibits the polarity "1" is a normal operation in this embodiment. However, the present invention is not limited to this polarity.

In addition, each of the comparators 611 and 612 may be shared among two or more taps, as described in the second embodiment.

In this embodiment, three flip-flops, i.e., the FFA through FFC, are used as the tap coefficient storing FF 112'. Alternatively, in the present invention, two flip-flops may be provided as the tap coefficient storing FF 112', or four or more flip-flops may be provided. In such cases, the numbers of the comparators and the masking units are each adjusted according to the number of the flip-flops constituting the tap coefficient storing FF 112'.

In this embodiment, a tap coefficient is input from the tap coefficient storing FF 112' to the absolute value computing unit 613. Alternatively, the tap coefficient may be input from the tap coefficient computing unit 114 to the absolute value computing unit 613 in the present invention. In addition, in this embodiment, a tap coefficient is input from the tap coefficient storing FF 112' to the multiplier 113. Alternatively, the tap coefficient may be input from the tap coefficient computing unit 114 to the multiplier 113 in this embodiment.

Embodiment 6

Figure 7:
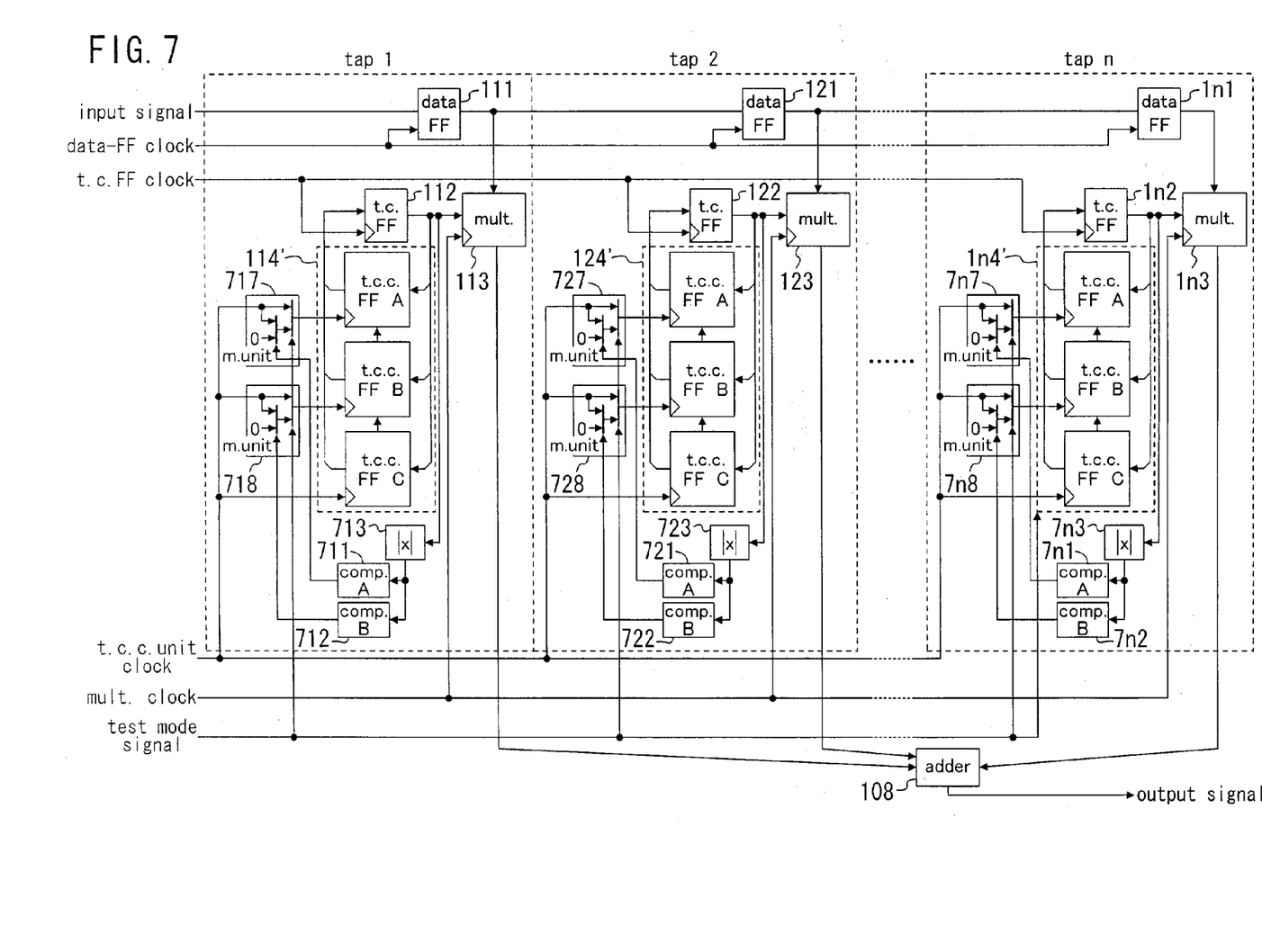
FIG. 7 is a circuit diagram showing a configuration of a filter according to a sixth embodiment of the present invention.

Hereinafter, a filter according to a sixth embodiment of the present invention will be described with reference to FIG. 7. FIG. 7 is a circuit diagram showing a configuration of the filter of the sixth embodiment.

The filter of this embodiment corresponds to the filter 201 or 202 in FIG. 2, and includes: n taps, i.e., tap 1 through tap n, each having substantially the same configuration; and an adder, as shown in FIG. 7.

The tap 1 in the filter of this embodiment includes: the data storing FF 111 for recording an input signal therein; computing units A through C constituting a tap coefficient computing units 114' for computing a tap coefficient $C_1$; the tap coefficient storing unit 112 for storing the tap coefficient $C_1$; the multiplier 113 for multiplying an output from the tap coefficient storing FF 112 and an output from the data storing FF 111 together, an absolute value computing unit 713 for obtaining the absolute value of the tap coefficient $C_1$; comparators 711 and 712 each for comparing the absolute value of the tap coefficient $C_1$ to a threshold value; a masking unit 717 for masking a tap-coefficient-computing-unit clock based on the comparison result from the comparator 711 and outputting a signal to the computing unit A; and a masking unit 718 for masking a tap-coefficient-computing-unit clock based on the comparison result from the comparator 712 and outputting a signal to the computing unit B. The taps 2 through n have the same configuration as that of the tap 1 so that signals resulting from multiplications by the multipliers 113 through 1n3 in the respective taps are added up by the adder 108 and the sum is output to the outside of the filter.

Hereinafter, it will be described how the filter of this embodiment operates with reference to FIG. 7.

As shown in FIG. 7, an input signal that has reached the filter of this embodiment is input to the taps 1 through n and processed therein in the same manner. In the tap 1, for example, the input signal is received by the data storing FF 111 in synchronization with a rising edge of a data-FF clock and is stored therein.

On the other hand, the tap coefficient computing unit 114' made up of the computing units A, B and C calculates a tap coefficient using Equation 1, also used in the first embodiment, and makes updates adaptively. In this case, a tap coefficient $C_{1(m)}$ based on an LMS algorithm is calculated in synchronization with a rising edge of a tap-coefficient-computing-unit clock. It should be noted that since the three computing units A through C are provided in the tap coefficient computing unit 114' in this embodiment, the tap coefficient $C_1$ is divided among the computing units A through C to be calculated. In this case, the computing unit A handles a tap coefficient $C_{1(m)}$, which is part of the tap coefficient $C_{1(m)}$ at the most-significant-bit (MSB) side, the computing unit C handles a tap coefficient $C_{1c(m)}$, which is part of the tap coefficient $C_{1(m)}$ at the least-significant-bit (LSB) side, and the computing unit B handles a tap coefficient $C_{1b(m)}$, which is the other part of the tap coefficient $C_{1(m)}$. Data for transmitting information for carry out may be output from the computing unit C to the computing unit B, or from the computing unit B to the computing unit A.

The tap coefficients $C_{1a(m)}$ through $C_{1c(m)}$ calculated in the respective computing units A through C are input to the tap coefficient storing FF 112 and are held therein. The tap coefficient $C_1$ held in the tap coefficient storing FF 112 is input to the absolute value computing unit 713 so that the absolute value thereof is calculated. Then, each of the comparators 711 and 712 compares the absolute value to a set threshold value, thereby outputting a signal "1" if the absolute value is equal to or larger than the threshold value, while outputting a signal "0" if the absolute value is smaller than the threshold value. A signal from the comparator 711 is input to the masking unit 717, and a signal from the comparator 712 is input to the masking unit 718.

The masking unit 717 masks a tap-coefficient-computing-unit clock according to a test mode signal input from outside of the tap and a signal "0" or "1" input from the comparator 711.

Specifically, if the test mode signal is "1", which represents a normal operation, and the input signal from the comparator 711 is "1", a tap-coefficient-computing-unit clock is output to the computing unit A without change. If the test mode signal is "1" and the input signal from the comparator 711 is "0", the tap-coefficient-computing-unit clock that has been replaced with a signal "0" is output. On the other hand, the test mode signal is "0", which represents a specific test mode, a tap-coefficient-computing-unit clock is output without change, irrespective of the output from the comparator 711.

As the masking unit 717, the masking unit 718 masks the tap-coefficient-computing-unit clock according to a test mode signal input from outside of the tap and a signal "0" or "1" input from the comparator 712 and outputs a signal to the computing unit B.

Specifically, among the computing units A through C constituting the tap coefficient computing unit 114', the computing unit A receives the tap coefficient $C_{1a(m)}$ held in the tap coefficient storing FF 112 in synchronization with a rising edge of a tap-coefficient-computing-unit clock input through the masking unit 717, and calculates a tap coefficient $C_{1a(m+1)}$.

In the same manner, the computing unit B receives the tap coefficient $C_{1b(m)}$ in synchronization with a rising edge of a tap-coefficient-computing-unit clock input through the masking unit 718, and calculates a tap coefficient $C_{1b(m+1)}$. The computing unit C receives the tap coefficient $C_{1c(m)}$ in synchronization with a rising edge of a tap-coefficient-computing-unit clock directly input thereto through no masking unit, and calculates a tap coefficient $C_{1c(m+1)}$.

In this case, the tap coefficient $C_{1(m)}$ is calculated in different ones of the computing units A through C according to the value (absolute value) thereof Specifically, there are three cases: a case where the tap coefficient $C_{1(m)}$ is divided into tap coefficients $C_{1c(m)}$, $C_{1b(m)}$ and $C_{1a(m)}$, which are input to the computing units A through C, thereby calculating tap coefficients $C_{1C(m+1)}$, $C_{1b(m+1)}$ and $C_{1a(m+1)}$; a case where the tap coefficient $C_{1(m)}$ is a tap coefficient $C_{1c(m)}$ and is input only to the computing unit C, thereby calculating a tap coefficient $C_{1C(m+1)}$; and a case where the tap coefficient $C_{1(m)}$ is divided into tap coefficients $C_{1c(m)}$ and $C_{1b(m)}$, which are input to the computing units B and C, thereby calculating tap coefficients $C_{1c(m+1)}$ and $C_{1b(m+1)}$.

In a normal operation, if the tap coefficient $C_{1(m)}$ is divided into tap coefficients $C_{1c(m)}$ is $C_{1b(m)}$ is $C_{1a(m)}$ to be input to the computing units A through C, tap-coefficient-computing-unit clocks are input to the computing units A through C. If the tap coefficient $C_{1(m)}$ is a tap coefficient $C_{1c(m)}$ and is input only to the computing unit C, tap-coefficient-computing-unit clocks are masked by the masking units 717 and 718 and are input not to the computing units A and B but only to the computing unit C. If the tap coefficient $C_{1(m)}$ is divided into tap coefficients $C_{1C(m)}$ and $C_{1b(m)}$ and is input to the computing units B and C, tap-coefficient-computing-unit clocks are masked by the masking unit 717 and are input not to the computing unit A but to the computing units B and C.

The tap coefficients $C_{1a(m+1)}$ through $C_{1c(m+1)}$ calculated by the computing units A through C are held in the tap coefficient storing FF 112 and input from the tap coefficient FF 112 to the multiplier 113. The multiplier 113 multiplies the tap coefficient $C_1$ and an output signal from the data storing FF 111 together in synchronization with a rising edge of a multiplier clock, and the product is output to the adder 108. The series of operations described above is performed in the same manner in the taps 2 through n.

Hereinafter, it will be described how the threshold value of each of the comparators 711 and 712 is set.

In this embodiment, when the tap coefficient computing unit 114' calculates a tap coefficient $C_{1(m+1)}$ at the point when the $(m+1)^{th}$ update has been completed, whether or not a tap-coefficient-computing-unit clock is input to each of the computing units A through C depends on the result of the comparison between the tap coefficient $C_{1(m)}$ at the point where the $m^{th}$ update has been completed and a threshold value. Accordingly, it is necessary to set the threshold value to be compared to the tap coefficient $C_{1(m)}$ by the comparator 711 or 712 in consideration of the upper limit of the difference that may occur between the tap coefficients $C_{1(m)}$ and $C_{1(m+1)}$. In general, the tap coefficient gradually varies with the number of updates in most cases, and is not likely to change greatly between the $m^{th}$ update and the $(m+1)^{th}$ update. Accordingly, it is possible to set the threshold value in such a manner.

Specifically, even if the tap coefficient $C_{1(m)}$ is smaller than the range of the LSB and the tap coefficient $C_{1(m+1)}$ exceeds the range of the LSB, the comparator 712 can set the threshold value such that a signal "1" is output. In this manner, a tap-coefficient-FF clock is input to the computing unit B without being masked by the masking unit 718. Accordingly, part of the tap coefficient $C_{1(m+1)}$ that exceeds the range of the LSB can also be calculated.

By setting the threshold value in the manner described above, among the computing units A through C in the tap coefficient computing unit 114', a tap-coefficient-FF clock is always input to a flip-flop to which data of the tap coefficients $C_{1(m+1)}$ is input.

In other words, the comparator 711 compares the tap coefficients $C_{1(m)}$ to the threshold value, thereby outputting a signal "0" in the case where it can be determined that the tap coefficients $C_{1(m+1)}$ is smaller than the range of values corresponding to the MSB, while outputting a signal "1" in the other cases. On the other hand, the comparator 712 compares the tap coefficients $C_{1(m)}$ to the threshold value, thereby outputting a signal "0" in the case where it can be determined that the tap coefficients $C_{1(m+1)}$ is smaller than the range of values corresponding to the LSB, while outputting a signal "1" in the other cases.

In this embodiment, the test mode signal is input from outside, so that a masking operation is performed according to the absolute value of the tap coefficient $C_1$ in a normal operation, while no masking operation is performed in a specific test operation such as a performance test. Specifically, in a normal operation, tap-coefficient-computing-unit clocks to be input to the computing units A through C constituting the tap coefficient computing unit 114' are masked according to the value of the tap coefficient $C_1$, and in a test operation, tap-coefficient-computing-unit clocks are input to the computing units A through C without being masked, irrespective of the value of the tap coefficient $C_1$.

In the known technique, a tap-coefficient-computing-unit clock is always input to a tap coefficient computing unit in a normal operation, irrespective of the value of a calculated tap coefficient $C_i$. On the other hand, in this embodiment, each of the comparators 711 and 712 makes a comparison beforehand to determine in which one of the computing units A through C constituting the tap coefficient computing unit 114' the tap coefficient $C_1$ is to be held. Based on the comparison, the masking units 717 and 718 mask tap-coefficient-computing-unit clocks. In this manner, it is possible to have a clock not input to a computing unit in the tap coefficient computing unit 114' in which the tap coefficient $C_1$ is not calculated (i.e., in which data does not vary upon the input of a tap coefficient). Accordingly, the power consumption in the tap coefficient computing unit 114' can be reduced. In addition, in a specific test operation, the tap coefficient $C_1$ is input to the tap coefficient computing unit 114' without being masked, thus improving the efficiency in a test such as failure detection for a circuit.

Most of the absolute values of the calculated tap coefficients $C_i$ are generally small in a waveform equalizer. In addition, a tap coefficient computing unit consumes electric power in some degree just by receiving a clock signal, irrespective of the presence of the variation in input data such as a tap coefficient $C_i$. In view of this, as compared to the known technique in which a clock signal is always input to a tap coefficient computing unit, the present invention allows large reduction in power consumption.

In this embodiment, a masking operation is performed when the polarity of the comparators 711 and 712 is "0", but the present invention is not limited to this polarity. In addition, though "0" is used for replacing inputs to the computing units A and B, other values may be used so long as they are fixed constants.

It is assumed that an operation in which the test mode signal exhibits the polarity "1" is a normal operation in this embodiment. However, the present invention is not limited to this polarity.

In addition, each of the comparators 711 and 712 may be shared among two or more taps, as described in the second embodiment.

In this embodiment, three flip-flops, i.e., the computing units A through C, are used in the tap coefficient computing unit 114'. Alternatively, in the present invention, two computing units may be provided in the tap coefficient computing unit 114', or four or more computing units may be provided. In such a case, the numbers of the comparators and the masking units are each adjusted according to the number of computing units constituting the tap coefficient computing unit 114'.

If a test mode signal is used to control the operation such that a clock input for a tap coefficient computing unit always varies, failure detection for a circuit, for example, can be easily conducted.

In this embodiment, a tap coefficient is input from the tap coefficient storing FF 112 to the absolute value computing unit 713. Alternatively, the tap coefficient may be input from the tap coefficient computing unit 114' to the absolute value computing unit 713 in the present invention. In addition, in this embodiment, a tap coefficient is input from the tap coefficient storing FF 112 to the multiplier 113. Alternatively, the tap coefficient may be input from the tap coefficient computing unit 114' to the multiplier 113 in the present invention.

What is claimed is:

1. A waveform equalizer provided with at least one shift register comprising:

a plurality of taps, each including an input unit for receiving an input signal, a tap coefficient update storing unit for updating a tap coefficient and storing the updated tap coefficient, and a multiplier for computing a product of the tap coefficient and the input signal;

an adder for computing a total sum of the products computed in the plurality of taps;

a comparator for comparing an absolute value of the tap coefficient to a threshold value, and producing a comparison result signal; and a masking unit for receiving the comparison result signal and, if the absolute value is smaller than the threshold value, replacing data for computing the total sum with a fixed value, the data being input to at least one of the input unit, the tap, the coefficient update storing unit, the multiplier and the adder.

2. The waveform equalizer of claim 1, wherein the waveform equalizer is used for digital broadcasting.

3. The waveform equalizer of claim 1, wherein the input unit has a function of holding the input signal, and wherein an absolute value computing unit for calculating the absolute value is further provided.

4. The waveform equalizer of claim 3, wherein in a normal operation, the comparator produces an ON signal if the absolute value is smaller than the threshold value, and produces an OFF signal if the absolute value is larger than the threshold value, and wherein the masking unit replaces data for computing the total sum with the fixed value on receiving the ON signal, and does not replace data for computing the total sum on receiving the OFF signal.

5. The waveform equalizer of claim 1, wherein the comparator is shared among two or more of the taps, and wherein the absolute value to be compared to the threshold value by the comparator is the sum of the absolute values of the tap coefficients in said two or more taps.

6. The waveform equalizer of claim 1, wherein the masking unit replaces the input signal to be input to the multiplier with the fixed value, if the absolute value is smaller than the threshold value.

7. The waveform equalizer of claim 1, wherein the masking unit replaces the product to be input to the adder with the fixed value, if the absolute value is smaller than the threshold value.

8. A shift register, comprising:

a plurality of taps, each including an input unit for receiving an input signal, a tap coefficient update storing unit for updating a tap coefficient and storing the updated tap coefficient, and a multiplier for computing a product of the tap coefficient and the input signal;

an adder for computing a total sum of the products computed in the plurality of taps;

a comparator for comparing an absolute value of the tap coefficient to a threshold value, and producing a comparison result signal; and a masking unit for receiving the comparison result signal and, if the absolute value is smaller than the threshold value, replacing data for computing the total sum with a fixed value, the data being input to at least one of the input unit, the tap, the coefficient update storing unit, the multiplier and the adder.

9. A waveform equalizer provided with at least one shift register comprising:

a plurality of taps, each including an input unit for receiving an input signal, a tap coefficient update storing unit for updating a tap coefficient and storing the updated tap coefficient, and a multiplier for computing a product of the tap coefficient and the input signal;

an adder for computing a total sum of the products computed in the plurality of taps;

a comparator for comparing an absolute value of the tap coefficient to a threshold value, and producing a comparison result signal; and a masking unit for receiving the comparison result signal and, if the absolute value is smaller than the threshold value, blocking at least part of a clock signal to be input to at least one of the input unit, the tap coefficient update storing unit, the multiplier and the adder to which the tap coefficient is input.

10. The waveform equalizer of claim 9, wherein the waveform equalizer is used for digital broadcasting.

11. The waveform equalizer of claim 9, wherein the input unit has a function of holding the input signal, and wherein an absolute value computing unit for calculating the absolute value is further provided.

12. The waveform equalizer of claim 11, wherein in a normal operation, the comparator produces an ON signal if the absolute value is smaller than the threshold value, and produces an OFF signal if the absolute value is larger than the threshold value, and wherein the masking unit blocks at least part of the clock signal on receiving the ON signal, and does not block the clock signal on receiving the OFF signal.

13. The waveform equalizer of claim 9, wherein the masking unit receives a test mode signal functioning as an ON signal at least in a test operation, and does not block the clock signal on receiving the test mode signal.

14. The waveform equalizer of claim 9, wherein the comparator is shared among two or more of the taps, and the absolute value, which is compared to the threshold value by the comparator, is the sum of the absolute values of the tap coefficients in said two or more taps.

15. The waveform equalizer of claim 9, wherein the masking unit blocks at least part of a clock signal to be input to the multiplier based on the comparison result signal.

16. The waveform equalizer of claim 9, wherein the tap coefficient update storing unit includes a tap coefficient updating unit for calculating the tap coefficient and a plurality of tap coefficient storing units for dividing the tap coefficient into partial tap coefficients and storing the respective partial tap coefficients therein, wherein at least one of the tap coefficient storing units is a first tap coefficient storing unit to which the clock signal is always input, and wherein each of the rest of the tap coefficient storing units is a second tap coefficient storing unit, to which input of a clock signal is blockable at least in part by the masking unit having received the comparison result signal.

17. The waveform equalizer of claim 16, wherein the comparator, the masking unit and the second tap coefficient storing unit are each provided in the same number, the comparator, the masking unit and the second tap coefficient storing unit being in correlation, wherein the comparator compares the respective absolute values of the partial tap coefficients to the threshold value, and wherein the masking unit is capable of blocking a clock signal to be input to the correlational second tap coefficient storing unit.

18. The waveform equalizer of claim 9, wherein the tap coefficient update storing unit includes: a plurality of tap coefficient updating units for calculating respective partial tap coefficients into which the tap coefficient has been divided; and a tap coefficient storing unit for recording the tap coefficient therein, wherein at least one of the tap coefficient updating units is a first tap coefficient updating unit to which a clock signal is always input, and wherein each of the rest of the tap coefficient updating units is a second tap coefficient updating unit, to which input of a clock signal is blockable at least in part by the masking unit having received the comparison result signal.

19. The waveform equalizer of claim 18, wherein the comparator, the masking unit and the second tap coefficient updating unit are each provided in the same number, the comparator, the masking unit and the second tap coefficient updating unit being in correlation, wherein the comparator compares the respective absolute values of the partial tap coefficients to the threshold value, and wherein the masking unit blocks a clock signal so that the clock signal is not input to the correlational second tap coefficient updating unit.

20. A shift register, comprising:

a plurality of taps, each including an input unit for receiving an input signal and a tap coefficient update storing unit for updating a tap coefficient and storing the updated tap coefficient therein;

a multiplier for computing a product of the tap coefficient and the input signal;

an adder for computing a total sum of the products computed in the plurality of taps;

a comparator for comparing an absolute value to a threshold value, and producing a comparison result signal; and a masking unit for receiving the comparison result signal and, if the absolute value is smaller than the threshold value, blocks at least part of a clock signal to be input to at least one of the input unit, the tap coefficient update storing unit, the multiplier and the adder to which the tap coefficient is input.

* * * * *